US012654428B2

(12) United States Patent
Okubo et al.

(10) Patent No.: US 12,654,428 B2
(45) Date of Patent: Jun. 16, 2026

(54) DECORATIVE SHEET

(71) Applicant: TOPPAN INC., Tokyo (JP)

(72) Inventors: Toru Okubo, Tokyo (JP); Daisuke Murata, Tokyo (JP)

(73) Assignee: TOPPAN INC., Tokyo (JP)

(*) Notice: Subject to any disclaimer, the term of this patent is extended or adjusted under 35 U.S.C. 154(b) by 651 days.

(21) Appl. No.: 17/532,154

(22) Filed: Nov. 22, 2021

(65) Prior Publication Data

US 2022/0080710 A1 Mar. 17, 2022

Related U.S. Application Data

(63) Continuation of application No. PCT/JP2020/021398, filed on May 29, 2020.

(30) Foreign Application Priority Data

May 30, 2019 (JP) ................................ 2019-101564

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/12* (2013.01); *B32B 27/32* (2013.01); *B32B 27/36* (2013.01);
(Continued)

(58) Field of Classification Search
CPC ........... B32B 27/08; B32B 7/12; B32B 27/32; B32B 27/36; B32B 2250/02; B32B 2250/24; B32B 2255/10; B32B 2255/26; B32B 2307/4023; B32B 2307/412; B32B 2307/554; B32B 2307/584; B32B 27/18;
(Continued)

(56) References Cited

U.S. PATENT DOCUMENTS

2007/0169887 A1* 7/2007 Kanagawa ........... D06N 3/0088 156/331.7
2015/0353746 A1* 12/2015 Tanaka ................. C09D 175/12 524/590
2020/0055976 A1* 2/2020 Hasegawa ............ C08G 18/227

FOREIGN PATENT DOCUMENTS

CN 105793355 A * 7/2016 ............. B32B 15/08
JP 2004276358 A * 10/2004
(Continued)

OTHER PUBLICATIONS

Machine translation of JP 2006-212981 A (Year: 2006).*
(Continued)

*Primary Examiner* — Callie E Shosho
*Assistant Examiner* — Steven A Rice
(74) *Attorney, Agent, or Firm* — Foley & Lardner LLP

(57) ABSTRACT

Decorative sheets having improved or even excellent adhesiveness and heat and moisture resistance. A decorative sheet includes at least a substrate layer, an adhesive layer, and a transparent resin layer, which are laminated in this order. The adhesive layer contains a polyester resin and a bisphenol A epoxy resin. The polyester resin contains, as components, phthalic acid, a linear dicarboxylic acid, and an alkylenediol. The polyester resin and the bisphenol A epoxy resin are contained in the adhesive layer in a mass ratio (polyester resin/bisphenol A epoxy resin) of 50/50 to 90/10.

13 Claims, 1 Drawing Sheet

(51) Int. Cl.
*B32B 27/32* (2006.01)
*B32B 27/36* (2006.01)

(52) U.S. Cl.
CPC ....... *B32B 2250/02* (2013.01); *B32B 2250/24* (2013.01); *B32B 2255/10* (2013.01); *B32B 2255/26* (2013.01); *B32B 2307/4023* (2013.01); *B32B 2307/412* (2013.01); *B32B 2307/554* (2013.01); *B32B 2307/584* (2013.01)

(58) Field of Classification Search
CPC .......... B32B 2250/242; B32B 2255/28; B32B 2307/306; B32B 2307/712; B32B 2307/714; B32B 2307/748; B32B 2451/00; B32B 27/16; B32B 33/00; C08G 18/3206; C08G 18/4018; C08G 18/4854; C08G 18/6229; C08G 18/6674; C08G 18/792; C08G 18/4277; C08G 18/48; C08G 18/6511; C08G 18/755; C08G 63/16; C09J 167/02; C09J 163/00; C09J 167/00
USPC ........................................................ 428/423.7
See application file for complete search history.

(56) References Cited

FOREIGN PATENT DOCUMENTS

| | | | | | |
|---|---|---|---|---|---|
| JP | 2006-212981 | A | | 8/2006 | |
| JP | 4281403 | B2 | | 6/2009 | |
| JP | 2012-035513 | A | | 2/2012 | |
| JP | 5158086 | B2 | | 3/2013 | |
| JP | 2014213578 | A | * | 11/2014 | ............ B32B 27/32 |
| JP | 2018-069672 | | | 5/2018 | |
| JP | 2019038897 | A | * | 3/2019 | |
| JP | 2019-151746 | A | | 9/2019 | |
| KR | 10-2018-0130518 | A | | 12/2018 | |
| WO | WO-2007086266 | A1 | * | 8/2007 | ................ C08J 3/07 |
| WO | WO-2010/110784 | A1 | | 9/2010 | |
| WO | WO 2015/087761 | A1 | | 6/2015 | |

OTHER PUBLICATIONS

Machine translation of WO 2007/086266 A1 (Year: 2007).*
Machine translation of JP 2012-035513 A (Year: 2012).*
Machine translation of CN 105793355 A (Year: 2016).*
Machine translation of JP 2019-038897 A (Year: 2019).*
Machine translation of JP 2004-276358 A (Year: 2004).*
Machine translation of JP 2014-213578 A (Year: 2014).*
Gogoi, R, et al., "Effect of increasing NCO/OH molar ratio on the physicomechanical and thermal properties of isocyanate terminated polyurethane prepolymer", Mar. 2014, International Journal of Basic and Applied Sicences, 3 (2), pp. 118-119 (Year: 2014).*
Precision Punch & Plastics, "Typical Properties of Polyethylene (PE)" Feb. 16, 2017, p. 2, archived at https://web.archive.org/web/20170216041545/https://precisionpunch.com/wp-content/pdf/uhmw.pdf (Year: 2017).*
Extended European Search Report on EP Appl. Ser. No. 20814787.6 dated Jun. 9, 2022 (8 pages).
International Searching Authority, "International Search Report" issued in connection with International Patent Application No. PCT/JP2020/021398, dated Aug. 11, 2020.
International Searching Authority, "Written Opinion" issued in connection with International Patent Application No. JP2020/021398, dated Aug. 11, 2020, 5 pages.
Office Action issued in corresponding Korean Patent Application No. 10-2021-7030874 dated Nov. 4, 2024.

* cited by examiner

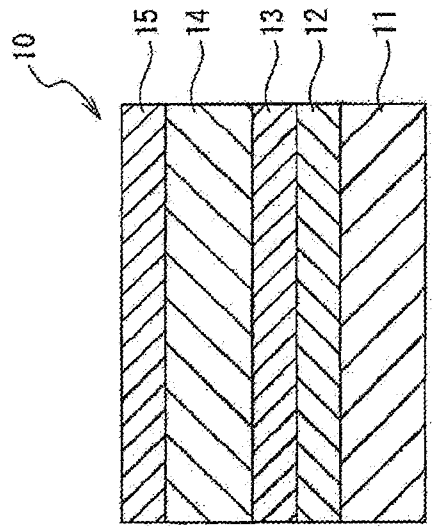
10
15
14
13
12
11

DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/021398, filed on May 29, 2020, which is based upon and claims the benefit of priority to Japanese Patent Application No. 2019-101564, filed on May 30, 2019; the disclosures of which are incorporated herein by reference in their entireties.

TECHNICAL FIELD

The present invention relates to decorative sheets.

BACKGROUND

Decorative sheets may be required to have resistance to high temperatures and high humidity (heat and moisture resistance) for applications such as exteriors of buildings and bathrooms. Decorative sheets typically include a substrate and a transparent resin layer laminated on the substrate via an adhesive layer. Conventionally and frequently used materials of the adhesive layer are polyester resins, which are generally excellent in terms of adhesiveness (PTL 1). However, polyester resins are prone to hydrolysis and may thus have insufficient heat and moisture resistance, which may cause delamination between the substrate and the transparent resin layer.

[Citation List] [Patent Literature] [PTL 1] JP 4281403 B

SUMMARY OF THE INVENTION

Technical Problem

To address the problem described above, an object of the present invention is to provide decorative sheets which are improved or even excellent in terms of adhesiveness and resistance to high temperatures and high humidity (heat and moisture resistance).

Solution to Problem

To achieve the above object, a decorative sheet according to an aspect of the present invention includes at least a substrate layer, an adhesive layer, and a transparent resin layer, which are laminated in this order. The adhesive layer contains a polyester resin and a bisphenol A epoxy resin. The polyester resin contains, as components, phthalic acid, a linear dicarboxylic acid, and an alkylenediol. The polyester resin and the bisphenol A epoxy resin are contained in the adhesive layer in a mass ratio (polyester resin/bisphenol A epoxy resin) of 50/50 to 90/10.

Advantageous Effects of the Invention

The present invention provides decorative sheets which are improved or even excellent in terms of adhesiveness and heat and moisture resistance.

BRIEF DESCRIPTION OF THE DRAWINGS

The FIGURE is a schematic cross-sectional view illustrating the configuration of a decorative sheet according to an embodiment of the present invention.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

[Configuration of Decorative Sheet]

As illustrated in the FIGURE, a decorative sheet 10 according to an embodiment of the present invention (hereinafter "present embodiment") includes a substrate layer 11, a pattern layer 12, an adhesive layer 13, a transparent resin layer 14, and a surface protective layer 15.

[Substrate Layer]

Preferable materials of the substrate layer 11 are polyolefins or polyesters and may be optionally selected from existing materials such as polyethylenes, polypropylenes, polybutylenes, polyethylene terephthalates, polybutylene terephthalates, and polyethylene naphthalates.

The substrate layer 11 may be subjected to surface treatment for increasing its adhesion to an adjacent layer. Examples of the surface treatment include corona treatment, plasma treatment, ozone treatment, electron beam treatment, ultraviolet treatment, and dichromate treatment.

[Adhesive Layer]

The adhesive layer 13 contains a polyester resin and a bisphenol A epoxy resin. The polyester resin contains, as components, phthalic acid, a linear dicarboxylic acid, and an alkylenediol. The polyester resin can be produced using known techniques (e.g., a polycondensation reaction between dicarboxylic acids and diols).

Mixing the bisphenol A epoxy resin into the polyester resin allows the adhesive layer 13 of the present embodiment to provide the decorative sheet 10 with heat and moisture resistance sufficient for practical applications. The bisphenol A epoxy resin may be selected as appropriate from various generally available grades of different molecular weights and epoxy equivalent weights. The molecular weight (weight average molecular weight MW) of the bisphenol A epoxy resin is preferably 1,000 or more and 4,000 or less and particularly preferably 1,000 or more and 2,000 or less from the viewpoint of achieving both heat and moisture resistance and adhesiveness.

The content of the bisphenol A epoxy resin is preferably such that a mass ratio (polyester resin/bisphenol A epoxy resin) is 50/50 to 90/10 from the viewpoint of achieving both heat and moisture resistance and adhesiveness. An excessively low content of the bisphenol A epoxy resin may result in insufficient heat and moisture resistance, while an excessively high content of the bisphenol A epoxy resin may result in insufficient adhesion.

The phthalic acid (which is a general term for orthophthalic acids and terephthalic acids in this embodiment) of the polyester resin is used to enhance the heat and moisture resistance of the adhesive layer 13. The content of the phthalic acid is preferably such that a ratio in terms of an amount of substance (molar ratio) (phthalic acid/linear dicarboxylic acid) is 45/55 to 85/15. An excessively high content of the phthalic acid may result in the adhesive layer 13 being hard and brittle and have an adverse effect on the adhesion thereof. An excessively low content of the phthalic acid may result in insufficient adhesion of the adhesive layer 13 due to insufficient cohesive force thereof.

The linear dicarboxylic acid of the polyester resin is selected as appropriate from, but not limited to, succinic acid, glutaric acid, adipic acid, pimelic acid, suberic acid, azelaic acid, sebacic acid, and the like.

While the alkylenediol of the polyester resin may be, for example, (poly)ethylene glycol, (poly)propylene glycol, (poly)tetramethylene glycol, (poly)hexamethylene glycol, or the like, it is preferably a combination of one or more of these with neopentyl glycol in terms of heat and moisture resistance.

The content of the alkylenediol is preferably such that a ratio in terms of an amount of substance (alkylenediol/(phthalic acid+linear dicarboxylic acid)) is 40/60 to 60/40. If the content of the alkylenediol in the polyester resin falls outside this numerical range, the polyester resin has a low molecular weight, which may result in insufficient adhesiveness and heat and moisture resistance.

The adhesive layer 13 may be formed using a common coating method such as gravure coating, micro gravure coating, comma coating, knife coating, or die coating.

[Pattern Layer]

The pattern layer 12 is a pattern printed on the substrate layer 11 using an ink. The ink used to form the pattern layer 12 may contain a binder resin, and the binder resin can be selected as appropriate from, for example, nitrocellulose, cellulose, vinyl chloride-vinyl acetate copolymer, polyvinyl butyral, polyurethane, acrylic, and polyester binder resins, and modified products thereof. Furthermore, these may be any of aqueous, solvent, and emulsion types, and may be a one-part type or a two-part type which uses a curing agent.

From the viewpoint of adhesion to the substrate layer 11 and heat and moisture resistance, the binder resin of the pattern layer 12 according to the present embodiment is preferably a urethane resin containing specific components, that is, at least a polycaprolactone polyol, a polyalkylene glycol, and a polyisocyanate.

A polycaprolactone polyol in the urethane resin of the present embodiment is a material that is obtained by ring-opening polymerization of £ caprolactone and has an ester bond therein. This configuration enhances the adhesion of the pattern layer 12 to the substrate layer 11, that is, substrate adhesion. The polycaprolactone polyol generally has improved or even excellent resistance to hydrolysis compared to general-purpose polyester polyols which may be produced by, for example, polycondensation of a dicarboxylic acid (e.g., adipic acid) and a diol.

A polyalkylene glycol in the urethane resin of the present embodiment has a polyether structure and, compared to the polycaprolactone polyol, has improved or even excellent resistance to hydrolysis, but tends to be inferior in heat and moisture resistance and substrate adhesion. In the present embodiment, the combined use of a polyalkylene glycol and a polycaprolactone polyol achieves both substrate adhesion and heat and moisture resistance.

Examples of the polyalkylene glycol include polyethylene glycols, polypropylene glycols, and polytetramethylene glycols; polytetramethylene glycols, which are highly hydrophobic, are preferable in terms of heat and moisture resistance.

The urethane resin of the present embodiment preferably further contains, as a component, a neopentyl glycol. The neopentyl glycol contained therein enhances heat and moisture resistance.

A polycaprolactone polyol and polyalkylene glycol of the present embodiment can be selected as appropriate from various commercially available materials in terms of molecular weights, the number of functional groups (the number of hydroxyl groups per molecule), and the like. Examples of the polyisocyanate include diisocyanates such as hexamethylene diisocyanate, isophorone diisocyanate, xylylene diisocyanate, and hydrogenated products thereof. Isophorone diisocyanate is preferable as the polyisocyanate in terms of heat and moisture resistance.

While the composition of the urethane resin of the present embodiment is not particularly limited, it preferably satisfies the following relational expressions (1) to (3) in consideration of printability of the pattern layer 12, which is generally formed by printing, and various properties of the decorative sheet 10. In the relational expressions, X, Y, Z and N refer to the amounts of substance of respective parts of the urethane resin shown in the following structural formulas, that is, a caprolactone unit (CL), an alkylene glycol unit (AG), a diisocyanate unit (I), and a neopentyl glycol (NPG).

CL unit (X): $—C(═O)C_5H_{10}O—$ [Chemical Formula 1]

AG unit (Y) (in the case of polytetramethylene glycol): $—C_4H_8O$

I unit (Z) (in the case of isophorone diisocyanate):

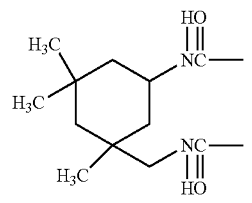

NPG unit (N): $—OCH_2C(CH_3)_2CH_2O—$ $$3<(X+Y+N)/Z<50 \quad \text{(expression 1)}$$

$$0.1<X/Y<10 \quad \text{(expression 2)}$$

$$N/(X+Y+X+N)<0.2 \quad \text{(expression 3)}$$

These numerical ranges easily enhance the printability of the pattern layer 12.

The molecular weight of the urethane resin of the present embodiment is not particularly limited, and, for example, a weight average molecular weight (MW) thereof is preferably 5,000 or more and 100,000 or less in consideration of printability of the pattern layer 12, which is generally formed by printing, and various properties of the decorative sheet 10.

This numerical range easily enhances the printability of the pattern layer 12.

A curing agent for curing the urethane resin of the present embodiment is not particularly limited and can be selected as appropriate from, for example, commercially available curing agents such as hexamethylene diisocyanate, isophorone diisocyanate, tolylene diisocyanate, xylylene diisocyanate, or hydrogenated products thereof, and diphenylmethane diisocyanate or hydrogenated products thereof.

While the pattern layer 12 is usually formed by printing, onto a substrate layer 11, a pattern ink in which the urethane resin described above is used as the binder resin, other resin components may be added thereto as required.

Examples of components of the pattern ink other than the binder resin include various additives such as colorants (e.g., pigments or dyes), extenders, solvents, and light stabilizers. Examples of pigments may include condensed azo pigment, insoluble azo pigment, quinacridone, isoindoline, anthraquinone, imidazolone, cobalt, phthalocyanine, carbon, titanium oxide, iron oxide, and pearl pigments of mica or the like.

The method of providing the pattern layer 12 is not particularly limited, and common printing methods such as gravure printing, offset printing, screen printing, flexographic printing, and inkjet printing can be used.

[Transparent Resin Layer]

The transparent resin layer 14 is preferably composed of a polyolefin, such as polypropylenes, polyethylenes, polybutenes, and various α-olefin copolymers (copolymers of propylenes, 1-butenes, 1-pentenes, 1-hexenes, 1-octenes, and the like).

The transparent resin layer 14 may contain various additives such as an ultraviolet absorber, a thermal stabilizer, a light stabilizer, an anti-blocking agent, a catalyst scavenger, a colorant, a light scattering agent, and a gloss adjuster as required.

The method of forming the transparent resin layer 14 is not particularly limited, and common methods such as calender film formation and extrusion film formation may be used.

The transparent resin layer 14 may be provided with asperities on its surface to impart design properties. Examples of the method of providing the transparent resin layer 14 with asperities include a method in which the transparent resin layer 14 is formed by extrusion molding and then subjected to hot embossing, and a method in which embossing is carried out at the same time as extrusion molding, using a chill roll provided with asperities, during extrusion molding.

[Surface Protective Layer]

The surface protective layer 15 is a layer provided to impart, to the decorative film 10, functions such as weather resistance, scratch resistance, stain resistance, and design properties. The material of the surface protective layer 15 is not particularly limited and can be selected as appropriate from resin materials such as urethane-based, acrylic-based, acrylic silicone-based, fluorine-based, and epoxy-based resin materials.

The surface protective layer 15 may contain various additives such as an ultraviolet absorber, a thermal stabilizer, a light stabilizer, an anti-blocking agent, a catalyst scavenger, a colorant, a light scattering agent, and a gloss adjuster as required.

The method of forming the surface protective layer 15 is not particularly limited, and the surface protective layer 15 may be formed by applying a liquid coating of the above materials using a common method such as gravure coating, microgravure coating, comma coating, knife coating, or die coating, and then curing the coating using a method suitable for the material, such as heat curing or ultraviolet curing.

The surface protective layer 15 may be joined to the transparent resin layer 14 before or after the transparent resin layer 14 is provided on the pattern layer 12 on the substrate layer 11 via the adhesive layer 13.

The thickness of each layer of the decorative sheet 10 according to the present embodiment will now be described.

The substrate layer 11 preferably has a thickness of 20 μm or more and 150 μm or less in view of print workability, cost, and the like. The pattern layer 12 preferably has a thickness of 0.5 μm or more and 10 μm or less; the adhesive layer 13 preferably has a thickness of 1 μm or more and 20 μm or less; the transparent resin layer 14 preferably has a thickness of 20 μm or more and 200 μm or less; and the surface protective layer 15 preferably has a thickness of 3 μm or more and 20 μm. Furthermore, the decorative sheet 10 preferably has a total thickness of 45 μm or more and 250 μm or less.

The present invention will be described in greater detail using examples and comparative examples.

Example 1

[Production of Print Primary Film]

A urethane resin with a terminal hydroxyl group, having a number average molecular weight of 2×104, was synthesized by a known addition polymerization method using polycaprolactone diol, polytetramethylene glycol, and neopentyl glycol as polyols, and isophorone diisocyanate as a polyisocyanate. A copper phthalocyanine-based pigment was then dispersed in the urethane resin in a mass ratio of 20/80 (pigment/urethane resin) to prepare a pattern ink.

The pattern ink was used to gravure-print a wood grain pattern on an opaque polyethylene primary film (thickness t=70 μm) to produce a print primary film in which a pattern layer 12 (thickness t=3 μm) was formed on a substrate layer 11.

[Preparation of Adhesive]

Using an isophthalic acid (IP) and an adipic acid (AD) as dicarboxylic acids, and an ethylene glycol and a hexanediol as diols, a polyester diol (polyester resin) P was synthesized (IP/AD=90/10 (molar ratio), a number average molecular weight of 1×104, and a solid content hydroxyl value: 10 mg KOH/g).

A bisphenol A epoxy resin EP (jER 1004 AF, manufactured by Mitsubishi Chemical Corporation) was added to the polyester diol (polyester resin) P in a solid content mass ratio of 70/30 (P/EP), and an isocyanate curing agent and a diluent were further added thereto to prepare an adhesive.

[Production of Decorative Sheet]

The adhesive was used to dry-laminate a transparent polyolefin resin on the print primary film, and a two-part curing polyurethane resin layer composed of an acryl polyol (a copolymer of a methyl methacrylate and a 2-hydroxy methacrylate) and a curing agent (a nurate of a hexamethylene diisocyanate) was formed by application, to thereby obtain a decorative sheet 10 of Example 1 in which an adhesive layer 13 (thickness t=1 μm), a transparent resin layer 14 (thickness t=70 μm), and a surface protective layer 15 (thickness t=8 μm) were formed.

Example 2

A decorative sheet 10 of Example 2 was obtained in the same manner as Example 1 except that P/EP=80/20 (solid content mass ratio).

Example 3

A decorative sheet 10 of Example 3 was obtained in the same manner as Example 1 except that P/EP=60/40 (solid content mass ratio).

Example 4

A decorative sheet 10 of Example 4 was obtained in the same manner as Example 1 except that IP/AD=65/35 (molar ratio).

Example 5

A decorative sheet 10 of Example 5 was obtained in the same manner as Example 4 except that an ethylene glycol, a hexanediol, and a neopentyl glycol were used as diols.

Comparative Example 1

A decorative sheet 10 of Comparative Example 1 was obtained in the same manner as Example 5 except that the content of a bisphenol A epoxy resin was such that P/EP=100/0.

Comparative Example 2

A decorative sheet 10 of Comparative Example 2 was obtained in the same manner as Example 5 except that the content of a bisphenol A epoxy resin was such that P/EP=40/60.

<Evaluation>

The adhesiveness and heat and moisture resistance of the decorative sheets obtained in the above Examples and Comparative Examples were evaluated according to the following method. Table 1 shows the evaluation results.

(a) Adhesiveness

The base material layer breaks without a peeling interface

For samples obtained from the decorative sheets stored at room temperature for 24 hours, a T-peel strength between a transparent resin layer and a substrate layer was measured (sample width: 25 mm, tensile speed: 50 mm/min).

[Evaluation Criteria]

- Excellent: Substrate breaks without delamination at interface
- Good: Delamination occurred at interface while substrate layer was deformed
- Poor: Delamination occurred at interface with no deformation caused in substrate layer
- Very poor: Delamination occurred during handling of sample and thus unmeasurable In the present examples, an evaluation Excellent or Good was regarded as acceptable.

(b) Heat and Moisture Resistance

For samples obtained from the decorative sheets stored at room temperature for 24 hours, a pressure cooker test (PCT) was performed using a HAST chamber (105° C. and 100% RH for 96 hours), and a T-peel strength between a transparent resin layer and a substrate layer was measured (sample width: 25 mm, tensile speed: 50 mm/min).

[Evaluation Criteria]

- Excellent: Substrate breaks without delamination at interface
- Good: Delamination occurred at interface while substrate layer was deformed
- Poor: Delamination occurred at interface with no deformation caused in substrate layer
- Very poor: Delamination occurred during handling of sample and thus unmeasurable In the present examples, an evaluation Excellent or Good was regarded as acceptable.

TABLE 1

| | Adhesive formulation | Polyester composition | | | | | |
|---|---|---|---|---|---|---|---|
| | (P/EP) mass ratio | (IP/AD) molar ratio | NPG | Adhesiveness | | Heat and moisture resistance | |
| | | | | Initial | Result | PCT 96 h | Result |
| Example 1 | 70/30 | 90/10 | None | Good | Acceptable | Good | Acceptable |
| Example 2 | 80/20 | 90/10 | None | Good | Acceptable | Good | Acceptable |
| Example 3 | 60/40 | 90/10 | None | Good | Acceptable | Good | Acceptable |
| Example 4 | 70/30 | 65/35 | None | Excellent | Acceptable | Good | Acceptable |
| Example 5 | 70/30 | 65/35 | Present | Excellent | Acceptable | Excellent | Acceptable |
| Comparative Example 1 | 100/0 | 65/35 | Present | Excellent | Acceptable | Very poor | Unacceptable |
| Comparative Example 2 | 40/60 | 65/35 | Present | Poor | Unacceptable | — | — |

*IP (isophthalic acid), AD (adipic acid), NPG (neopentyl glycol),

P (polyester resin), EP (bisphenol A epoxy resin)

As seen from Table 1, the decorative sheets 10 of Examples 1 to 5 had excellent adhesiveness and heat and moisture resistance due to a polyester resin of an adhesive layer 13 having a specific composition and a bisphenol A epoxy resin being contained therein in a specific ratio. In particular, the decorative sheet of Example 5 containing a neopentyl glycol as a diol, which was a component of a polyester resin, had better heat and moisture resistance than Example 4.

[Reference Signs List] 10 . . . Decorative sheet; 11 . . . Substrate layer; 12 . . . Pattern layer; 13 . . . Adhesive layer; 14 . . . Transparent resin layer; 15 . . . Surface protective layer.

What is claimed is:

1. A decorative sheet, comprising:

a substrate layer;

an adhesive layer;

a transparent resin layer, and a surface protective layer laminated on the transparent resin layer, the substrate layer, the adhesive layer, and the transparent resin layer being laminated in this order, wherein the adhesive layer consists of a polyester resin and a bisphenol A epoxy resin in a mass ratio between the polyester resin and the bisphenol A epoxy of 60/40 to 80/20, the polyester resin is synthesized using (a) an isophthalic acid (IP) and an adipic acid (AD) as dicarboxylic acids and (b) an ethylene glycol, a hexanediol and optionally a neopentyl glycol as diols, wherein a mass ratio between the IP and the AD is 65/35 to 90/10, the transparent resin layer does not comprise polypropylene, the surface protective layer does not comprise a fluorine-based resin material.

2. The decorative sheet of claim 1, further comprising a pattern layer between the substrate layer and the adhesive layer.

3. The decorative sheet of claim 2, wherein the pattern layer contains, as a binder resin, a urethane resin, the urethane resin containing, as components, a polycaprolactone polyol, a polyalkylene glycol, and a polyisocyanate.

4. The decorative sheet of claim 3, wherein the urethane resin further contains, as a component, neopentyl glycol.

5. The decorative sheet of claim 3, wherein the polyalkylene glycol is polytetramethylene glycol.

6. The decorative sheet of claim 3, wherein the polyisocyanate is isophorone diisocyanate.

7. The decorative sheet of claim 2, consisting of the substrate layer, the pattern layer, the adhesive layer, the transparent resin layer, and the surface protective layer.

8. The decorative sheet of claim 7, wherein the substrate layer has a thickness of 20 μm or more and 150 μm or less; the pattern layer 1 has a thickness of 0.5 μm or more and 10 μm or less; the adhesive layer has a thickness of 1 μm or more and 20 μm or less; the transparent resin layer has a thickness of 20 μm or more and 200 μm or less; the surface protective layer preferably has a thickness of 3 μm or more and 20 μm and the decorative sheet has a total thickness of 45 μm or more and 250 μm or less.

9. The decorative sheet of claim 1, wherein the transparent resin layer is composed of a polyolefin resin.

10. A decorative sheet, comprising:

a substrate layer;

a pattern layer;

an adhesive layer;

a transparent resin layer, and a surface protective layer laminated on the transparent resin layer, the substrate layer, the pattern layer, the adhesive layer, and the transparent resin layer being laminated in this order, wherein the adhesive layer consists of a polyester resin and a bisphenol A epoxy resin in a mass ratio between the polyester resin and the bisphenol A epoxy of 60/40 to 80/20, the polyester resin is synthesized using (a) an isophthalic acid (IP) and an adipic acid (AD) as dicarboxylic acids and (b) an ethylene glycol, a hexanediol and optionally a neopentyl glycol as diols, wherein a mass ratio between the IP and the AD is 65/35 to 90/10, the surface protective layer does not comprise a fluorine-based resin material, the pattern layer comprises a binder resin that is an urethane resin comprising a caprolactone unit (CL), an alkylene glycol unit (AG), a diisocyanate unit (I), and a neopentyl glycol (NPG), the urethane resin satisfies the following expressions:

$$3<(X+Y+N)/Z<50 \quad \text{(expression 1)}$$

$$0.1<X/Y<10 \quad \text{(expression 2)}$$

$$N/(X+Y+X+N)<0.2 \quad \text{(expression 3)},$$

wherein X is a content of the caprolactone unit, Y is a content of the alkylene glycol unit, Z is a content of the diisocyanate unit and N is a content of the neopentyl glycol unit.

11. The decorative sheet of claim 10, wherein the alkylene glycol unit is —$C_4H_8O$; and the diisocyanate unit is

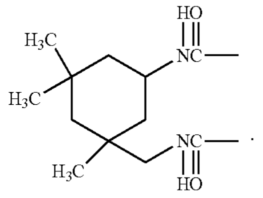

12. The decorative sheet of claim 10, consisting of the substrate layer, the pattern layer, the adhesive layer, the transparent resin layer, and the surface protection layer.

13. The decorative sheet of claim 12, wherein the substrate layer has a thickness of 20 μm or more and 150 μm or less; the pattern layer 1 has a thickness of 0.5 μm or more and 10 μm or less; the adhesive layer has a thickness of 1 μm or more and 20 μm or less; the transparent resin layer has a thickness of 20 μm or more and 200 μm or less; the surface protective layer preferably has a thickness of 3 μm or more and 20 μm and the decorative sheet has a total thickness of 45 μm or more and 250 μm or less.

* * * * *